United States Patent
Beasley

(10) Patent No.: US 7,592,943 B2
(45) Date of Patent: Sep. 22, 2009

(54) FREQUENCY MODULATED CONTINUOUS WAVE (FMCW) RADAR HAVING IMPROVED FREQUENCY LINEARITY

(75) Inventor: Patrick D L Beasley, Malvern (GB)

(73) Assignee: QinetiQ Limited, London (GB)

( * ) Notice: Subject to any disclaimer, the term of this patent is extended or adjusted under 35 U.S.C. 154(b) by 83 days.

(21) Appl. No.: 11/662,363

(22) PCT Filed: Sep. 21, 2005

(86) PCT No.: PCT/GB2005/003609

§ 371 (c)(1),
(2), (4) Date: Mar. 8, 2007

(87) PCT Pub. No.: WO2006/035199

PCT Pub. Date: Apr. 6, 2006

(65) Prior Publication Data

US 2008/0088503 A1    Apr. 17, 2008

Related U.S. Application Data

(60) Provisional application No. 60/616,429, filed on Oct. 6, 2004.

(30) Foreign Application Priority Data

Sep. 28, 2004    (GB) ................................ 0421520.8

(51) Int. Cl.
*G01S 13/00* (2006.01)
(52) U.S. Cl. ............................. 342/27; 342/89; 342/175
(58) Field of Classification Search ................... 342/27, 342/33, 36, 73, 82, 83, 85, 89, 98, 175
See application file for complete search history.

(56) References Cited

U.S. PATENT DOCUMENTS 4,276,549 A * 6/1981 Tomasi ........................ 342/87

(Continued)

FOREIGN PATENT DOCUMENTS

DE    3 342 057    5/1985

(Continued)

OTHER PUBLICATIONS

International Search Report for PCT/GB2005/003609 mailed Dec. 6, 2005.

(Continued)

*Primary Examiner*—Thomas H Tarcza
*Assistant Examiner*—Peter M Bythrow
(74) *Attorney, Agent, or Firm*—Nixon & Vanderhye P.C.

(57) ABSTRACT

A frequency modulated continuous wave (FMCW) radar is described that comprises a frequency sweep generator for producing a swept frequency signal. A discriminator receives a portion of the swept frequency signal and produces a reference difference-frequency signal. The discriminator comprises an optical delay means, which may comprises a laser diode, an optical fibre and a detector for producing a time displaced frequency swept signal from which the difference-frequency signal is derived. A transceiver is also described that generates the signal to be transmitted by the radar from the swept frequency signal and produces a target difference-frequency signal. An analogue-to-digital converter (80) samples the target difference-frequency signal at a rate derived from the frequency of the reference difference-frequency signal. Use of the radar in various applications, such as detecting foreign object debris on airport runways and perimeter security, are also described.

34 Claims, 6 Drawing Sheets

U.S. PATENT DOCUMENTS

| | | | | | |
|---|---|---|---|---|---|
| 4,733,239 | A | * | 3/1988 | Schmitt | 342/94 |
| 5,291,569 | A | * | 3/1994 | Goutzoulis et al. | 385/39 |
| 5,389,933 | A | * | 2/1995 | Golinsky | 342/201 |
| 5,757,311 | A | * | 5/1998 | Voyce | 342/130 |
| 6,255,984 | B1 | * | 7/2001 | Kreppold et al. | 342/128 |
| 6,317,074 | B1 | * | 11/2001 | Johnson | 342/82 |
| 6,400,308 | B1 | * | 6/2002 | Bell et al. | 342/71 |

FOREIGN PATENT DOCUMENTS

| | | | |
|---|---|---|---|
| DE | 3342057 | * | 5/1985 |
| DE | 33 42 057 | | 5/1995 |
| DE | 195 22 464 | | 1/1996 |
| EP | 1 195 888 | | 4/2002 |
| GB | 2 083 966 | | 3/1982 |

OTHER PUBLICATIONS

UK Search Report GB0421520.8, date of search Mar. 3, 2005.

Ferri et al., *A Novel W-band Radar for Airport Traffic Monitoring: Implementation, First Operational Results, Perspectives*, Physics and Engineering of Millimeter and Sub-Millimeter Waves, 2001, The Fourth International Kharkov Symposium, Jun. 4-9, 2001, vol. 1, pp. 27-32, XP010555179.

* cited by examiner

FREQUENCY MODULATED CONTINUOUS WAVE (FMCW) RADAR HAVING IMPROVED FREQUENCY LINEARITY

This application is the U.S. national phase of international application PCT/GB2005/003609 filed 21 Sep. 2005, which designated the U.S. and claims benefit of GB 0421520.8 filed 28 Sep. 2004, and U.S. Provisional Appln. No. 60/616,429 filed 6 Oct. 2004, the entire contents of each of which are hereby incorporated by reference.

The present invention relates to Frequency Modulated Continuous Wave (FMCW) radar and in particular to FMCW radar apparatus having improved frequency sweep linearity and a method of operating such apparatus.

FMCW radar systems are well known and have been widely used for many years. In such systems the range to a target is measured by systematically varying the frequency of a transmitted radio frequency (RF) signal. Typically, the radar is arranged so that the transmitted frequency will vary linearly with time; for example a triangular or saw-tooth frequency sweep is implemented. This frequency sweep effectively places a "time stamp" on the transmitted signal at every instant and the frequency difference between the transmitted signal and the signal returned from a target (i.e. the reflected or received signal) can be used to provide a measure of target range. It is also well known to those skilled in the art that the accuracy of the range information provided by an FMCW radar depends on the linearity of the frequency sweep. Those skilled in the art have thus proposed numerous techniques over the years for improving the frequency sweep linearity of FMCW radar systems.

In a typical FMCW radar, a voltage controlled oscillator (VCO) is used to convert a voltage variation into a corresponding frequency variation. Although it is trivial to produce a high quality linear voltage variation (e.g. a triangular or saw-tooth waveform), conversion to the corresponding frequency variation by the VCO often results in the introduction of significant non-linearities that seriously degrade the range resolution of the FMCW radar. Attempts have been made to produce VCOs that are inherently linear. For example, YIG oscillators are produced by Micro Lambda Wireless Inc, Freemont, Calif., USA in which the fine-tuning coil produces a linearity of, at best, 0.1%. However, such devices typically offer poor bandwidth and are presently relatively expensive.

It is also known to modify or pre-distort the voltage tuning signal applied to the VCO to compensate for any non-linearity in the VCO response characteristics. Analogue pre-distortion allows a waveform to be produced that is linear to within around 2 to 5%, but the technique is susceptible to temperature effects and ageing. Digital pre-distortion of the VCO tuning signal is also known and involves measuring the frequency tuning characteristic of the VCO to generate a look-up table. Use of the look-up table enables the tuning signal applied to the VCO to be modified to compensate for any VCO non-linearities. These techniques can improve the linearity to better than about 1% and digital pre-distortion techniques have thus been used with some success in low cost FMCW radar applications. However, the technique requires careful design to avoid unwanted digital noise modulating the VCO.

At present, the most commonly used technique for providing high performance FMCW radars is closed loop feedback. The closed loop feedback technique has been implemented in a variety of ways but they are all based upon creating an artificial target which generates a "beat" frequency when mixed with a reference signal. In a perfectly linearised FMCW radar a fixed range target would produce a constant "beat" frequency. Therefore, in a practical FMCW radar, if the "beat" frequency drifts from the desired constant frequency value an error signal can be generated to fine tune the VCO to maintain a constant "beat" frequency. This feedback technique can be implemented at the final RF frequency of the radar or at a lower, down-converted, frequency. Waveforms having a linearity better than 0.05% have been demonstrated but, unless the system is very well designed, the technique can be prone to instabilities and is typically limited in bandwidth to about 600 MHz. Also, because the VCO is modulated directly, the phase noise signal of the resultant transmit signal can be compromised. An example of such a feedback loop arrangement is given in the paper "Novel 24 GHz FMCW Front End with 2.45 GHz SAW Reference Path for High-Precision Distance Measurements" by M Nalezinski, M Vossiek, P Heide, (Siemens AG, Munich), IEEE MTT-S International Microwave Symposium, Prague, June 1997.

It has also been described previously in GB2083966 and GB1589047 how non-linear frequency sweep effects can be reduced by sampling the returned signal in a non-linear manner. In particular, GB2083966 and GB1589047 describe how an artificial, fixed range, target may be used to generate a "beat" frequency from which a stream of sampling pulses can be derived. The interval between such sampling pulses would be constant for a perfectly linear frequency sweep, but will vary if the frequency sweep is non-linear. Use of a sample-and-hold circuit to sample the returned signal (i.e. the signal returned by a real target) compensates for any non-linearities in the frequency sweep of the transmitted signal. However, the systems described in GB2083966 and GB1589047 are only suited to short range operation and offer limited sensitivity. It is for this reason that those skilled in the art have discounted such arrangements for use in FMCW systems and have concentrated their efforts on the pre-distortion and closed loop feed back arrangements that are described above.

According to a first aspect of the present invention, a frequency modulated continuous wave (FMCW) radar comprises; a frequency sweep generator for producing a swept frequency signal; a discriminator for receiving a portion of the swept frequency signal and for producing a reference difference-frequency signal of frequency equal to the difference between the frequency of the swept frequency signal and the frequency of a time displaced swept frequency signal derived from the swept frequency signal; a transceiver for generating the signal to be transmitted by the radar from the swept frequency signal, the transceiver also producing a target difference-frequency signal of frequency equal to the difference between the frequency of the signal transmitted by the radar and the frequency of the signal returned to the radar from a remote target(s); and an analogue-to-digital converter (ADC) for sampling the target difference-frequency signal at a rate derived from the frequency of the reference difference-frequency signal, characterised in that the discriminator comprises an optical delay means for producing the time displaced frequency swept signal.

An FMCW radar is thus provided having a frequency sweep generator for producing a swept frequency signal; for example, a saw-tooth or triangular frequency varying signal. The radar also comprises a transceiver that is arranged to receive a portion of the swept frequency signal and to produce therefrom an FMCW signal for transmission by the radar. The transceiver is also arranged to generate a target difference-frequency signal by mixing the swept frequency signal that is transmitted by the radar (the transmit signal) with the signal returned to the radar from a remote target or targets (the return signal).

The radar also includes a discriminator which produces a reference difference-frequency signal by mixing a time displaced swept frequency signal, which could be considered to correspond to the return signal from an artificial target, with a portion of the swept frequency signal. The target difference-frequency signal produced by the transceiver is sampled by the ADC at a sampling rate that is dynamically altered in response to the frequency of the reference difference-frequency signal. In other words, the reference difference-frequency signal is used to clock the ADC which is sampling the target difference-frequency signal. This arrangement compensates for any non-linearity in the frequency swept signal produced by the frequency sweep generator and the ADC outputs a digitised signal having frequency components which are directly related to target range(s).

Unlike the system described in GB2083966, the radar apparatus of the present invention comprises a discriminator that includes an optical delay means for generating the time displaced frequency swept signal from a portion of the frequency swept signal. Preferably, the optical delay means comprises at least one optical fibre delay line; this provides a physically compact and robust optical arrangement. In use, the optical delay means converts, preferably using at least one laser diode, a portion of the electrical swept frequency signal to a corresponding intensity modulated optical signal. The optical signal is passed along an optical path or waveguide, such as a length of optical fibre, before being converted back to an electrical signal. Preferably, the optical delay means comprises at least one optical detector to convert the optical signal back to an electrical signal. The electrical signal output by the optical detector (i.e. the time displaced swept frequency signal) is thus delayed (i.e. time displaced) relative to the swept frequency signal output by the frequency sweep generator. The time displaced swept frequency signal is then mixed with a portion of the undelayed swept frequency signal to generate the reference difference-frequency signal.

There are numerous advantages associated with a radar that includes an optical delay means of the present invention. For example, the optical delay means can include a long length (e.g. many tens or hundreds of metres or even several kilometres) of low loss optical fibre. This enables long delays to be imparted to the time displaced frequency swept signal without any appreciable signal loss thereby allowing radar apparatus to be provided having a long maximum range of operation. Furthermore, an optical fibre based delay means provides very low levels of dispersion and has waveguide properties that are stable over a wide temperature range and do not vary significantly over time. This prevents unwanted, and unpredictable, variations in the duration of the delay being introduced when the operating environment of the radar is altered or as the equipment ages.

It should be re-emphasised that radar apparatus of the present invention, and in particular the provision of the optical delay means instead of an electrical delay means, provides significant, and quite unexpected, advantages over the devices described in GB2083966 that use high loss microwave delay lines to produce the time displaced frequency swept signal. Furthermore, the radar of the present invention uses an open loop control mechanism and is thus inherently more stable and robust than the prior art closed loop feedback techniques described above. The result is an FMCW radar which achieves a linearity over a large RF bandwidth that is unprecedented in FMCW radar design.

Advantageously, the optical delay means is arranged to produce a time displaced frequency swept signal having any one of a plurality of different time displacements relative to the frequency swept signal. In other words, the optical delay means is arranged such that the duration of the delay imparted to the time displaced frequency swept signal can be selected as required.

Conveniently, the optical delay means comprises a multi-tap optical fibre delay line. The optical delay means may be arranged to alter the delay imparted to the time displaced frequency swept signal using the multi-tap optical fibre delay line in combination with optical switching and/or electrical switching techniques.

For example, a single laser diode could be used to couple a modulated optical signal into the multi-tap optical fibre. In the case of electrical switching, an electro-optic detector may then be provided at each, or at least some, of the optical tap points. An electrical selector switch may then be used to direct the electrical output of only the desired electro-optic detector for mixing with the frequency swept signal to produce the reference difference-frequency signal. Alternatively, a laser diode may be provided at each, or at least some, of the optical tap points and a single detector provided which will receive radiation coupled into the optical fibre. Routing the frequency swept signal to the appropriate laser diode, or powering only the required laser diode, will then determine the delay that is imparted to the signal received by the detector.

In the case of optical switching, the output intensity of a laser diode is modulated by the swept frequency signal. The modulated laser light would then be coupled into the multi-tap optical fibre and the output of each, or at least some, of the tap points fed to an optical selector switch. The optical selector switch will then route the optical signal that imparts the required delay to the electro-optic detector for conversion to an electrical signal and for subsequent mixing with the frequency swept signal. Again, an alternative arrangement would comprise using an optical selector switch to route the laser output to any one of the multi-tap points and having the electro-optic detector optically-coupled to a single tap point along the fibre. As noted above, a combination of electrical and optical switching would also be possible.

Advantageously, the optical delay means comprises a plurality of optical fibres of different lengths. In this case, each optical fibre may have an electro-optic detector and laser diode associated therewith to allow electrical switching to be used to select the required delay. Alternatively, the optical output of the laser may be routed via a first optical switch to the selected fibre and the output of that fibre optically routed via a second optical switch to the electro-optic detector. A combination of electrical and optical switching would also be possible in a similar manner to that described above in respect of multi-tap optical fibres.

Following the above, the skilled person would appreciate the various ways in which the optical delay means of the present invention could be arranged to impart a plurality of different delays between the time displaced frequency swept signal and the frequency swept signal. The skilled person would also be aware of the various optical and electrical components, such as those used in telecommunication systems, that could be used to implement an appropriate switching arrangement.

The provision of an optical delay means that can impart any one of a plurality of delays to the time displaced frequency swept signal has a number of advantageous over the fixed delay prior art system of GB2083966. For example, it allows the maximum range of the radar to be readily varied as required during use. In other word, the maximum range of the radar (which is inversely related to the radar's range resolution) can be increased or decreased as required during use.

The ability to adapt the range of the device as and when required provides a more flexible radar system that can be easily adapted for use in a variety of locations and/or for a number of different applications. It should be noted that an alteration to the delay that is imparted by the optical delay means may result in the need to alter other radar parameters to maintain optimum performance; for example, the bandwidth of the frequency sweep and/or the duration of the frequency sweep may need to be altered. A more detailed explanation of the relationship between the delay, frequency sweep bandwidth and sweep duration is given below.

Advantageously, the delay imparted by the optical delay means is selected to be equivalent to a multiple of the time-of-flight of a transmitted signal to a target at the maximum required radar range.

As described in more detail below, if the frequency variation of the frequency swept signal is non-linear, the reference difference-frequency signal will comprise a sine wave that varies in frequency in a manner that is related to the non-linearity of the frequency swept signal. Advantageously, an analyser is provided to convert the reference difference-frequency signal produced by the discriminator into a series of timing pulses that are separated by intervals related to the frequency of the reference difference-frequency signal, wherein the timing pulses are used to clock the ADC.

Preferably, the analyser comprises a zero crossing detector. In this case, a clocking pulse will be generated whenever the voltage of the reference difference-frequency signal crosses zero. As noted below, the zero crossing detector could be arranged to produce a timing pulse on every zero crossing of the signal or only when zero is crossed from the positive or negative direction. The analyser may also comprise a frequency doubler for doubling the frequency of the signal that is applied to the zero crossing detector. It should be noted that, rather than providing an analyser of the type described above, an ADC could be used that can be clocked directly by a sine wave.

The frequency sweep generator may advantageously be arranged to output any one of a saw-tooth and triangular wave swept frequency signal. Conveniently, the frequency sweep generator comprises a voltage controlled oscillator. Because the VCO does not require an accurate tuning characteristic, it can be very low cost such as, for example, the type used in the mobile telecommunications industry.

Preferably, the frequency sweep generator comprises a voltage signal generator for outputting a digitally pre-distorted tuning signal to the voltage controlled oscillator. In this manner, the linearity of the VCO can be improved. Although the radar of the present invention will compensate for the non-linearity of any monotonic swept frequency signal, it is preferable that the voltage controlled oscillator outputs a swept frequency signal having a linearity of better than 10%, especially in cases when the radar also includes an anti-alias filter. The inclusion of such an anti-alias filter improves performance of the radar by cutting off any frequencies higher than the Nyquist frequency, but may lead to loss of signal detection sensitivity near maximum range if the linearity of the swept frequency signal is greater than around 10%.

Herein, the term "linearity" shall mean the percentage deviation of the frequency gradient away from linear. This may be expressed as a "±x %" value to refer to the minimum and maximum variations, or simply as an average deviation of "x %". A small percentage linearity value thus means a highly linear signal (zero being perfectly linear), whereas a high percentage linearity value means a signal of poor linearity. Describing linearity in this manner is commonly used by those skilled in the art.

Advantageously, the swept frequency signal produced by the frequency sweep generator has a frequency range within a first frequency band and the signal transmitted by the radar has a frequency range within a second frequency band, the frequencies contained in the first frequency band being lower than the frequencies contained in the second frequency band. The transceiver conveniently comprises a frequency up-converter for increasing the frequency of the swept frequency signal to the frequency of the signal to be transmitted by the radar. Preferably, the frequency up-converter comprises a stable local oscillator (STALO). The phase noise of the STALO is ideally of the same order as the phase noise of the VCO of the frequency sweep generator.

It is thus preferred to implement the invention using a so-called up-conversion architecture in which the frequency sweep generator operates at a much lower frequency that the frequency that is finally transmitted by the radar. For example, the frequency sweep generator may operate in the UHF band (e.g. several hundred MHz to a few GHz) whilst the radar transmits a signal having a frequency of anything from 10 GHz to more than 100 GHz. The swept frequency signal generated in the low frequency band is up-converted to the radar transmission frequency band by an appropriate up-converter. It should also be noted that although the signal returned to the radar from a remote target is obviously within the same frequency band as the transmitted signal, when the transmit and receive signal are homodyne mixed they produce a target difference-frequency signal at baseband frequencies. This architecture thus allows the frequency sweep generator, discriminator, ADC etc to operate in the lower frequency, UHF, band. This reduces both the cost and complexity of the radar and inherently lends itself to better phase noise performance. This leads to improved radar sensitivity compared with designs such as those described in GB2083966 in which the frequency sweep is generated directly at the final radar operating frequency.

A further advantage of an up-conversion architecture of this type is that the majority of the linearisation circuitry (i.e. the frequency sweep generator, discriminator, ADC) is independent of the radar transmission frequency. The same linearisation circuitry can thus be used for different applications at different RF frequencies; although the transceiver components such as the STALO must obviously be selected so as to produce the required radar output frequency. The linearisation circuitry can thus be used in runway debris monitoring radars operating at 94.5 GHz, perimeter security radars operating at 35 GHz, level measurement radar transmitting at 24 GHz, bird detection radars working at 17 GHz or marine navigation radar operating at 9 GHz.

A frequency modulated continuous wave (FMCW) radar may thus be provided that comprises a frequency sweep generator for producing a swept frequency signal; a discriminator for receiving a portion of the swept frequency signal and producing a reference difference-frequency signal having a frequency equal to the difference between the frequency of the swept frequency signal and the frequency of a time displaced swept frequency signal derived from the swept frequency signal; a transceiver for generating the signal to be transmitted by the radar from a portion of the swept frequency signal, the transceiver also producing a target difference-frequency signal having a frequency equal to the difference between the frequency of the signal transmitted by the radar and the frequency of the signal returned to the radar from a remote target(s); and an analogue-to-digital converter (ADC) for sampling the target difference-frequency signal at a rate derived from the frequency of the reference difference-frequency signal, wherein the swept frequency signal produced by the frequency sweep generator has a frequency range within a first frequency band and the signal transmitted by the radar has a frequency within a second frequency band, the centre frequency of the first frequency band being lower than the centre frequency of the second frequency band.

In such a radar, the transceiver may advantageously be arranged to receive a portion of the swept frequency signal and comprise an up-convertor for increasing the frequency of the swept frequency signal to the frequency of the signal to be transmitted by the radar. Furthermore, the frequency up-converter may conveniently comprise a stable local oscillator (STALO). Advantageously, the discriminator comprises an optical delay means for producing the time displaced frequency swept signal.

The radar may further comprise an antenna and the antenna may preferably comprise separate transmit and receive antenna elements. In other words, a bistatic antenna array could be provided. A monostatic antenna could alternatively be used.

Preferably, the radar is arranged to transmit a signal within a frequency band of 9 GHz to 150 GHz, or more preferably within a frequency band of 70-80 GHz or 90-100 GHz. The radar may conveniently be arranged to transmit a signal having a frequency around 77 GHz or 94.5 GHz; these frequencies are advantageous as they fall within windows in atmospheric absorption.

Any commercial radar system would preferably be arranged to operate at frequencies that also lie within the international frequency allocations as governed by the International Telecommunications Union (ITU). In the United Kingdom, frequency allocations are governed by the communications regulatory body, OFCOM. It would thus be convenient to provide a radar that transmits a signal having a frequency within the ranges 76-81 GHz, 92-95 GHz or 95-100 GHz.

At frequencies above approximately 40 GHz, it is typically necessary to guide signals using microwave waveguides. The radar is thus conveniently arranged to transmit a signal having a frequency greater than 40 GHz. The up-conversion aspect of the present invention reduces the amount of microwave circuitry required to implement such a radar and hence reduces the cost of providing such a system.

Advantageously, the optical delay means comprises an optical waveguide that produces a delay equivalent to the delay imparted by a free space path length of more than 100 m, more than 500 m, more than 1 km, more than 2 km, more than 5 km, more than 10 km, more than 20 km or more than 40 km. It should be noted that the physical length of the optical waveguide will typically be shorter than the equivalent free space path length that the delay is intended to simulate. In other words, the effective refractive index of the optical fibre core is likely to be greater than the refractive index of free space. The physical length of the optical waveguide is thus selected to produce an equivalent time delay to the time taken for the radar energy to traverse a certain free space path length.

It can thus be seen that the optical delay means enables a delay to be produced that is equivalent to a free space path length of many hundreds of metres or even many tens of kilometres. This is in contrast to prior art techniques comprising electronic delay lines formed from lengths of co-axial cable. The length of co-axial cable that could be used in such an arrangement is typically restricted to around 50 m by the high level of RF loss and the shear physical size of the arrangement. Co-axial cable solutions also suffer from variations in frequency dispersion with temperature.

Although prior art devices, such as those described in GB2083966, have attempted to increase the delay that is achievable from a co-axial cable delay line using phase locked loops and the like, this simply degrades the performance of the system. It can thus be seen that the present invention allows a delayed swept frequency signal to be generated having a much greater delay than previously possible.

According to a second aspect of the invention, an apparatus for detecting a object on a surface comprises a radar according to the first aspect of the invention. Preferably, the object comprises foreign object debris (FOD) and the surface comprises an airport runway.

According to a third aspect of the invention, perimeter security apparatus is provided that comprises a radar according to the first aspect of the invention.

According to a fourth aspect of the invention, a frequency linearisation module for a frequency modulated continuous wave (FMCW) radar comprises a frequency sweep generator for producing a swept frequency signal; a discriminator for receiving a portion of the swept frequency signal and producing a reference difference-frequency signal of frequency equal to the difference between the frequency of the swept frequency signal and the frequency of a time displaced swept frequency signal derived from the swept frequency signal, characterised in that the discriminator comprises an optical delay means for producing the time displaced frequency swept signal.

The linearisation module is preferably used in a radar according to the first aspect of the invention. In particular, the frequency linearisation module may be fitted to existing FMCW radars to improve their linearity response.

Advantageously, the linearisation module may be used as part of a closed loop feedback FMCW radar. For example, the reference difference-frequency signal generated by the discriminator could be fed to a feedback controller. The feedback controller could then be arranged to dynamically vary the properties of the voltage tuning signal that is applied to a VCO of the frequency sweep generator in response to any variations in the frequency of the reference difference-frequency signal over a sweep period. In other words, the feedback controller would vary the voltage tuning signal in order to keep the frequency of the reference difference-frequency signal constant. The closed loop feedback radar may comprise a frequency sweep generator that generates the swept frequency signal at the final transmit frequencies, or it may conveniently be constructed using an up-conversion architecture of the type described above.

According to a fifth aspect of the invention, a method of operating a frequency modulated continuous wave (FMCW) radar comprises the steps of: (i) generating a swept frequency signal; (ii) producing a reference difference-frequency signal of frequency equal to the difference between the frequency of the swept frequency signal and the frequency of a time displaced swept frequency signal derived from the swept frequency signal; (iii) generating a signal to be transmitted by the radar from the swept frequency signal, (iv) producing a target difference-frequency signal of frequency equal to the difference between the frequency of the signal transmitted by the radar and the frequency of the signal returned to the radar from a remote target(s); and (v) sampling the target difference-frequency signal using an analogue-to-digital converter (ADC) wherein the ADC sampling rate is derived from the frequency of the reference difference-frequency signal, characterised in that the time displaced frequency swept signal used in the step (ii) of producing a reference difference-frequency signal is generated using an optical delay means.

Conveniently, the method further comprises the step of using the radar to detect an object on a surface. Advantageously, the step of using the radar to detect an object on a surface comprises using the radar to detect foreign object debris (FOD) on an airport runway. Alternatively, or additionally, the method may also comprise the step of using the radar to monitor the perimeter of a defined area, such as a perimeter fence.

The invention will now be described, by way of example only, with reference to the following drawings in which.

Figure 1A:
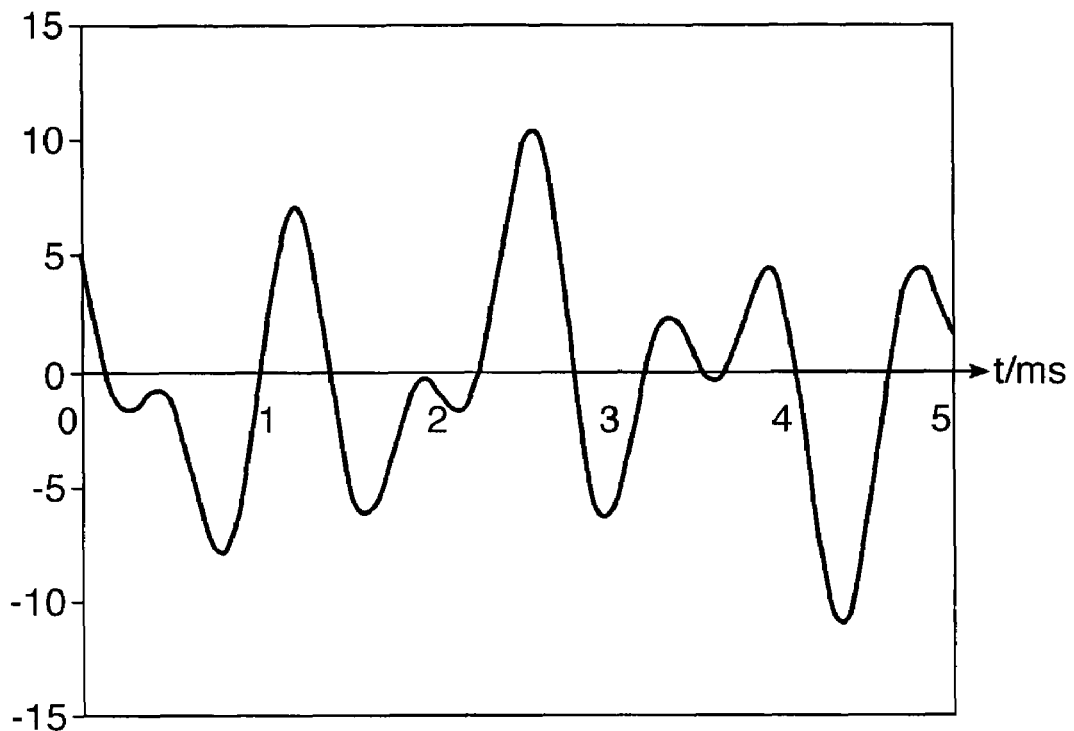
FIG. 1 shows (a) the intensity of a received time domain signal after down-conversion and (b) the frequency of the output signal of a typical FMCW radar as a function of time.
Figure 1B:
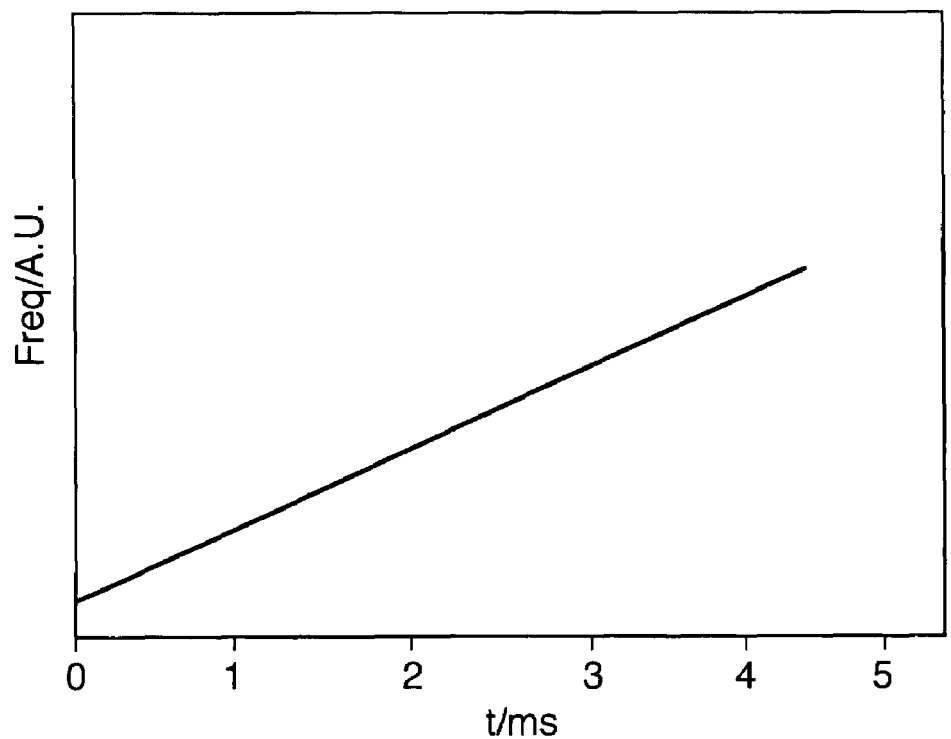

Referring to FIG. 1, the underlying principle of an FMCW radar that is linearly swept in frequency is illustrated. FIG. 1a illustrates the amplitude of the received signal (after down-conversion) as a function of time for an FMCW radar whilst FIG. 1b illustrates the variation in frequency of the radar output as a function of time.

Figure 2A:
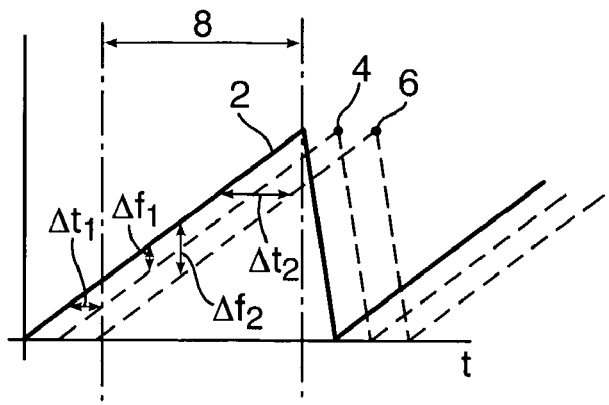
FIG. 2 shows (a) the transmitted and received frequency signals of a FMCW radar, (b) the difference frequency components of the received signals and (c) resolved frequency components of the signal.

FIG. 2 illustrates how range information can be determined using an FMCW radar. Line 2 of FIG. 2a shows the saw-tooth frequency variation of the transmitted signal of the radar, line 4 shows the frequency variation with time of a signal returned from a target at a first distance $d_1$ from the radar and line 6 shows the frequency variation with time of a signal returned from a second target at a second distance $d_2$ from the radar. In this case, the target at $d_2$ is approximately twice the distance from the radar as the target at of $d_1$.

It can be seen that line 4 is time shifted (i.e. delayed) from line 2 by $\Delta t_1$, whilst line 6 is time shifted by $\Delta t_2$ from line 2. This time shift depends on the time taken for the return signal to travel to the relevant target and back and is thus indicative of the range to the target. In this theoretical example, the variation of frequency with time is perfectly linear within the measurement window 8. It can thus be seen that the return from the target at $d_1$ is frequency shifted from the transmitted signal by the frequency $\Delta f_1$ within the whole of measurement window 8. Similarly, the return from the target at $d_2$ is frequency shifted from the transmitted signal by the frequency $\Delta f_2$.

Figure 2B:
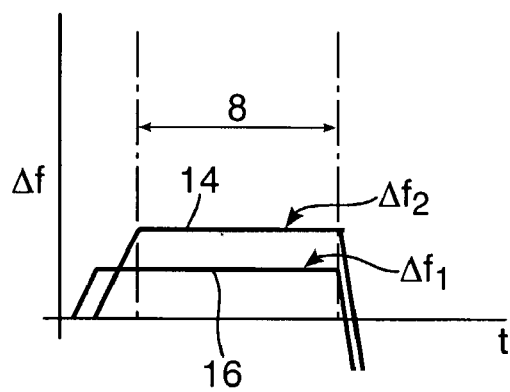
Figure 2C:
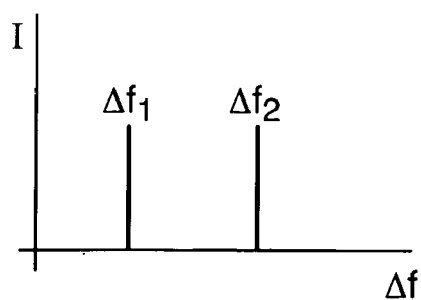

In an FMCW radar, the return signal received by the radar is mixed with the transmitted signal. This produces a difference or beat signal of a frequency (or containing a number of frequency components) equal to the difference in frequency between the transmitted and received signal. FIG. 2b illustrates the frequency component 14 that that would be produced by mixing the transmitted signal with the signal returned from the target at $d_1$ and the frequency component 16 that that would be produced by mixing the transmitted signal with the signal returned from the target at $d_2$. A Fast Fourier Transform (FFT) technique provides a frequency analysis of these mixed signals over time within the measurement window 8 and provides the radar return intensity as a function of frequency as shown in FIG. 2c. The observed frequency shift (or target beat frequency $f_b$) is related to the range (R) of the target by the expression;

$$f_b = \frac{2R}{c} \frac{\Delta F}{\Delta T} \qquad (1)$$

where c is the speed of light, $\Delta F$ is the frequency bandwidth (i.e. maximum frequency minus minimum frequency) and $\Delta T$ is the sweep duration. The gradient of the linear frequency sweep (i.e. $\Delta F/\Delta T$) is known, thereby allowing the range to the target(s) to be calculated from the measured beat frequency.

Figure 3A:
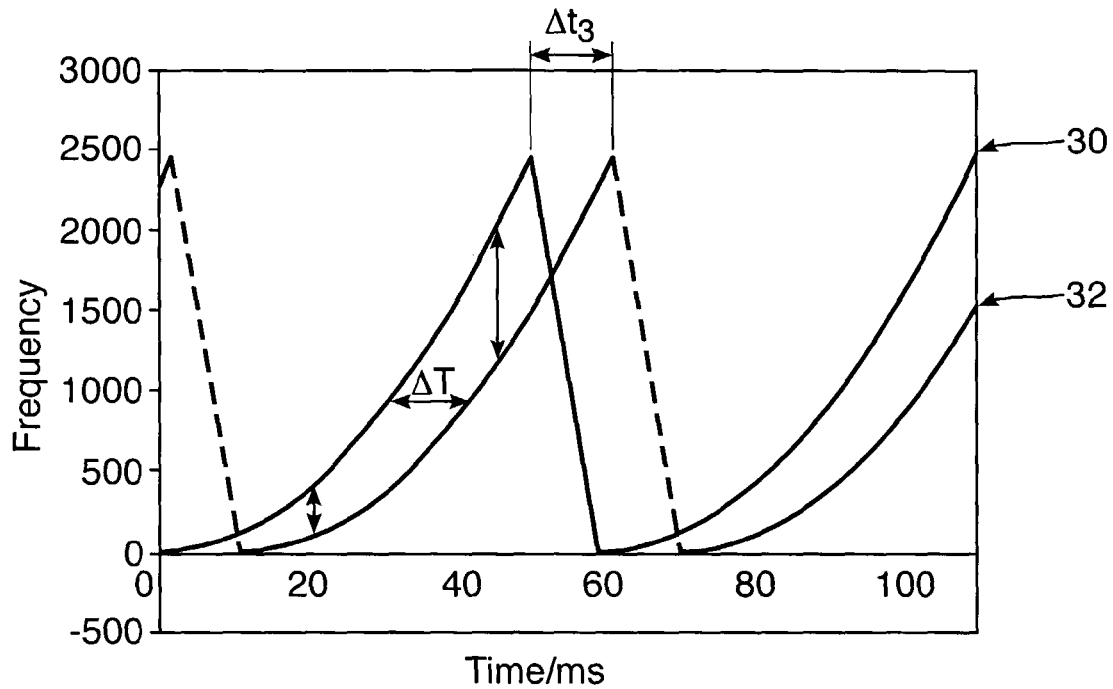
FIG. 3 illustrates the effect of a non-linear frequency sweep on the output of an FMCW radar.
Figure 3B:
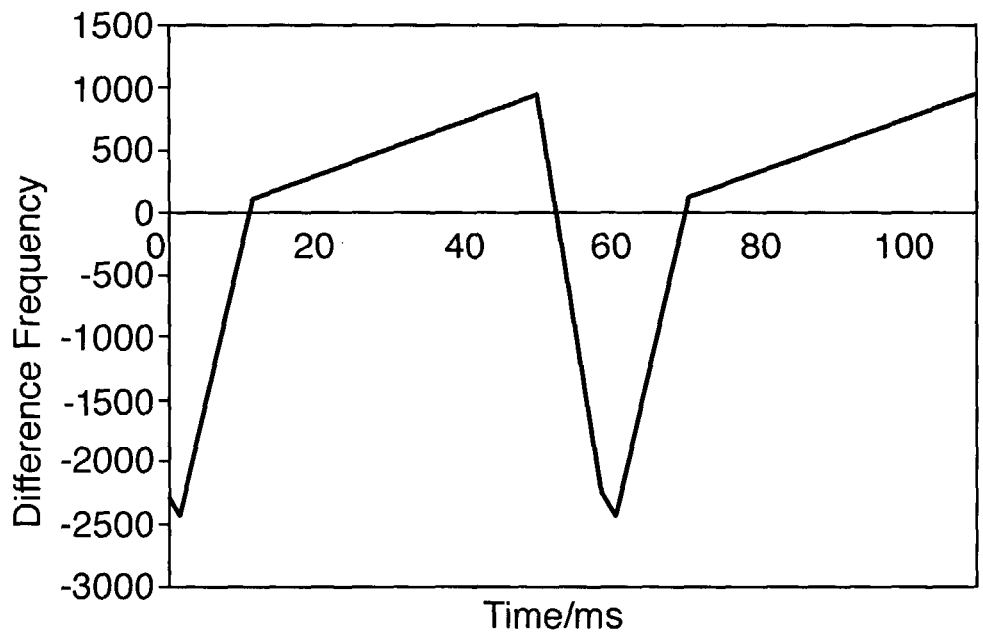

As noted above, a truly linear frequency sweep is difficult to obtain in a real radar system. Referring now to FIG. 3, it can be seen how the use of a non-linear sweep frequency can seriously degrade the accuracy of the range information acquired by the radar. In particular, FIG. 3a shows a transmitted signal that has a non-linear frequency sweep signal (curve 30). Although the return signal (curve 32) is time shifted from the transmitted signal (curve 30) by a constant delay $\Delta t_3$, the frequency difference between the two signals is no longer constant with time. This can be seen from FIG. 3b in which the frequency difference (i.e. the beat frequency of the transmitted and received signal) is shown as a function of time. Non-linearity of the frequency sweep thus introduces a large error into the range measurement and it can be seen why providing a radar having a linear frequency sweep is desirable.

Figure 4:
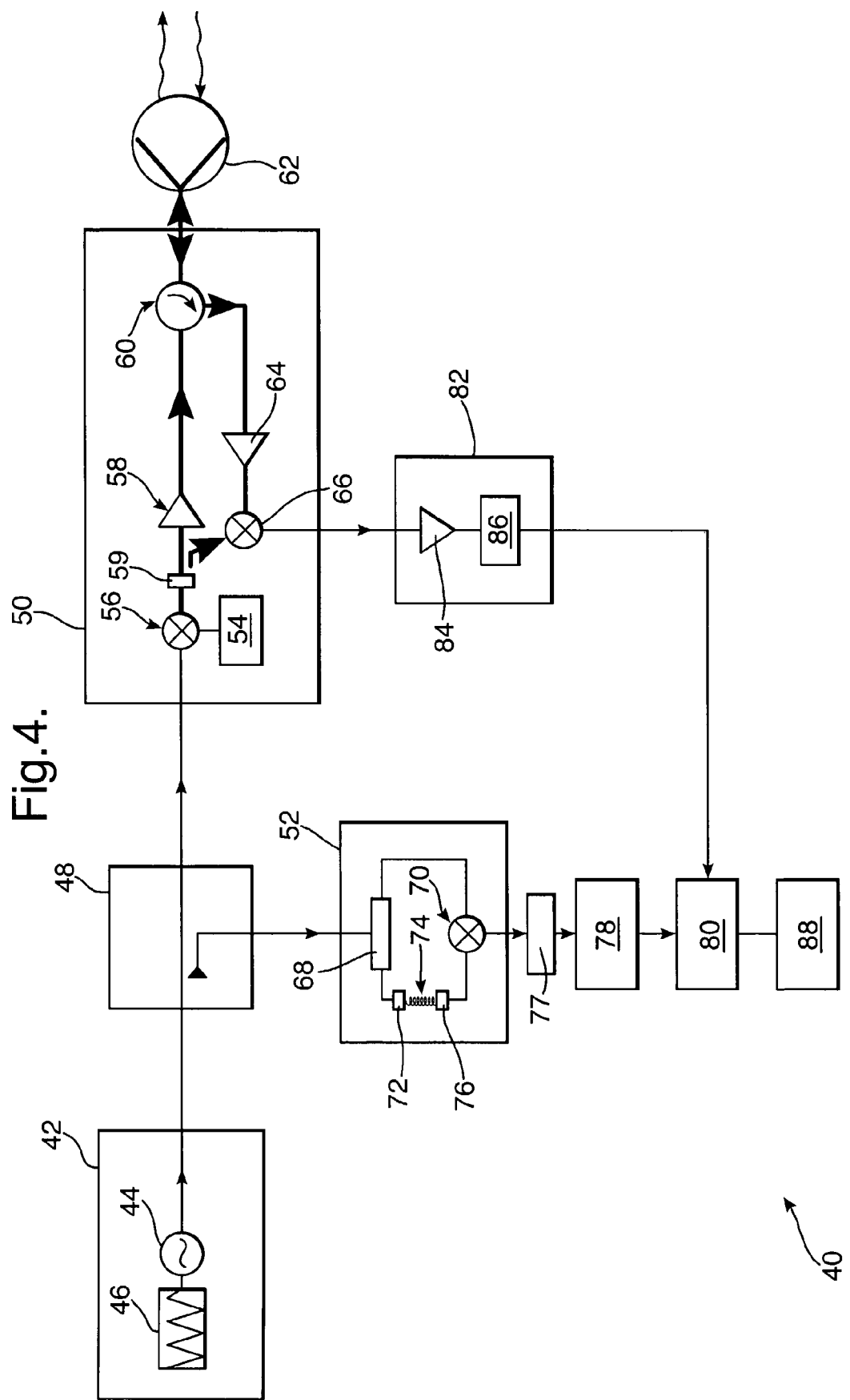
FIG. 4 is a block diagram illustrating an FMCW radar of the present invention.

Referring now to FIG. 4, an FMCW radar 40 of the present invention is illustrated.

The radar 40 comprises a frequency sweep generator 42 for outputting a saw-tooth frequency sweep signal at UHF frequencies. The frequency sweep generator 42 includes a voltage controlled oscillator (VCO) 44 arranged to receive a voltage control signal from a tuning signal generator 46.

The VCO 44 is a very low phase noise voltage controlled oscillator (VCO). Suitable VCOs are commercially available at low cost from a number of manufacturers and are commonly used in mobile telecommunication applications and the like. The VCO 44 has a monotonic tuning characteristic, but the tuning linearity of the VCO is not critical. The tuning signal generator 46 digitally generates a tuning signal and includes a filter (not shown) to remove digital quantisation noise. This allows digital pre-distortion of the VCO tuning signal thereby enabling the VCO to output a frequency sweep with a linearity of better than 10%. The frequency waveform is preferably saw-tooth in nature and bandwidths of at least 1500 MHz, corresponding to 12.5 cm range resolution, are readily achievable Although a digital tuning signal generator 46 is described, the skilled person would recognise that the VCO tuning signal could alternatively be generated by a simple analogue integrator circuit. Similarly, the frequency sweep generator could be arranged to produce alternative linear waveforms (e.g. triangular waveforms etc).

The output of the frequency sweep generator 42 is passed to a divider 48. The divider 48 splits the signal into two; the divided signal is thus fed to both a radar transceiver 50 and a delay line discriminator 52.

The radar transceiver 50 has a homodyne architecture. The transceiver 50 comprises a stable local oscillator (STALO) 54 and a first frequency mixer 56 which upcoverts the low frequency signal received from the divider 48 to the desired RF frequency (typically around 94.5 GHz). A sideband reject filter 59 is provided to remove the lower sideband from the RF frequency signal; it should be noted that the upper side band could alternatively be removed from the RF signal. The RF signal (which now contains only the upper side band) is then amplified by an RF power amplifier 58 and passed through a circulator 60 to the antenna 62. In this technique the key element is the STALO 54 which preferably has a low phase noise.

The return signal received by the antenna 62 is passed, via the circulator 60, to a low noise amplifier 64. The amplified return signal output by the low noise amplifier 64 is then mixed, using the In-phase Quadrature (IQ) frequency mixer 66, with an extract of the RF signal output. In other words, the radar returns from the target(s) are converted directly to baseband by IQ frequency mixing with a sample of the signal currently being transmitted. The baseband return signal is then passed to a conditioning circuit 82, which includes an amplifier 84 and an anti-alias filter 86, before being passed to an analogue to digital converter (ADC) 80. The anti-alias filter 86 is arranged to reject any frequency components of the signal that have a frequency greater than a predetermined level. The anti-alias filter 86 is typically arranged to reject anything having a frequency greater than the Nyquist frequency.

It should be noted that the radar can be configured either as a single antenna system using the same antenna for transmit and receive (i.e. a monostatic arrangement) or as a dual antenna system with separate antennas for transmit and receive (i.e. a bistatic arrangement). Although a monostatic antenna arrangement is shown in FIG. 4 for simplicity, the bistatic arrangement is preferred as it has the advantage of providing optimal isolation of transmitter phase noise from the receiver.

As outlined above, the divider 48 also outputs a portion of the output of the frequency ramp generator 42 to the delay line discriminator 52. The delay line discriminator 52 comprises a further divider 68, a further frequency mixer 70, a laser source 72, an optical fibre delay line 74 and an optical detector 76.

The further divider 68 of the delay line discriminator 52 splits the received VCO signal into two paths. The first path passes the signal straight to the local oscillator port of the further frequency mixer 70. The second path passes the VCO signal to the laser source 72. The output of the laser source is intensity modulated by the received VCO signal and passes along the optical fibre delay line 74 before being converted back to an electrical signal by the optical detector 76. The electrical signal produced by the optical detector 76 is then passed to the RF input port of the frequency mixer 70. As explained in more detail below, the length of the optical fibre delay line 74 is selected to impart a delay that is equivalent to the delay that would be produced by a target at the maximum instrumented range of the radar, or is twice that length. It should be noted that the delay imparted by the optical fibre delay line 74 could subsequently be increased electronically, for example using a phase locked loop.

The laser source 72 is a solid state semiconductor laser, such as a distributed feedback (DFB) or distributed Bragg reflector (DBR) laser. The VCO signal is used to modulate the laser diode current supply, thereby intensity modulating the laser output. Laser diodes are presently commercially available that can be intensity modulated at rates up to around 18 GHz, and laser diodes have been reported that can be modulated at rates up to 70 GHz. Optical detectors 76 that can operate at these modulation rates are also commercially available from many sources. To minimise optical dispersion effects, the optical fibre delay line 74 is preferably formed from single mode optical fibre.

It can thus be seen that the present invention provides a suitably long delay time by modulating the electrical signal onto an optical carrier, passing it down a fibre optic delay line and then demodulating the optical signal back to an electrical signal. The use of an fibre optic delay line enables large bandwidths of several gigahertz to be delayed by substantial periods equivalent to many tens of kilometres with virtually no loss. In addition, fibre optic delay lines have very low frequency dispersion which can be a limiting factor in RF coaxial lines, particularly over large temperature variations. It should also be noted that switchable optical delay lines or multi-tapped optical delay line allow radars to be produced that have switchable maximum instrumented ranges.

The use of an optical fibre delay line thus removes the range limitations that are present when coaxial delay lines are used. Furthermore, and unlike systems which employ surface acoustic wave (SAW) delay lines, there is no trade off between the length of delay and the maximum achievable bandwidth.

The signal output by the delay line discriminator 52 is fed to a zero crossing detector 78 via a selectable frequency doubler 77. It should be noted that the signal output by the delay line discriminator 52 is equivalent to the return from a target at the maximum instrumented range if the length of the optical fibre delay line 74 is made equal to twice the maximum instrumented range of the radar or to half that range if the length of the optical fibre delay line 74 is made equal to the maximum instrumented range of the radar. Furthermore, as explained in more detail below, the frequency of the signal output by delay line discriminator 52 will vary during the frequency sweep according to the variation in VCO frequency slope.

The zero crossing detector 78 is arranged to generate a clocking pulse whenever the voltage of the signal output by the delay line discriminator 52 crosses zero. These clocking pulses are used to define the sampling times of the analogue to digital converter (ADC) 80 that is used to sample the radar returns from real targets. The zero-crossing detector 78 can be implemented either by hard-limiting the output of the delay line discriminator 52 and using a comparator to generate the ADC clock signal. Alternatively, in cases where the ADC 80 is of a type that accepts a sine-wave clock, the output of the delay line discriminator 52 can simply be amplified to the required level for the ADC 80. In this manner, the non-linear effects of the frequency sweep generator 42 (in particular the VCO 44) will have been compensated for and near-perfect frequency linearity is achieved. Furthermore, again due to the non-linear sampling of the ADC, spurious frequency spurs often associated with ADCs are smeared out and effectively eliminated.

The digitised output of the ADC 80 is fed to a digital signal processor 88 which extracts the frequency components of the returned radar signal. These frequency components are, because of the linearisation technique, directly related to range.

The basic concept of using non-linear sampling to dynamically change the interval at which the return signal is sampled to compensate for the non-linearity of the frequency sweep generator is described in more detail in GB2083966 and GB1589047. However, a brief summary of the way in which the technique works using the apparatus of FIG. 4 will now be given with reference to FIG. 5.

Figure 5A:
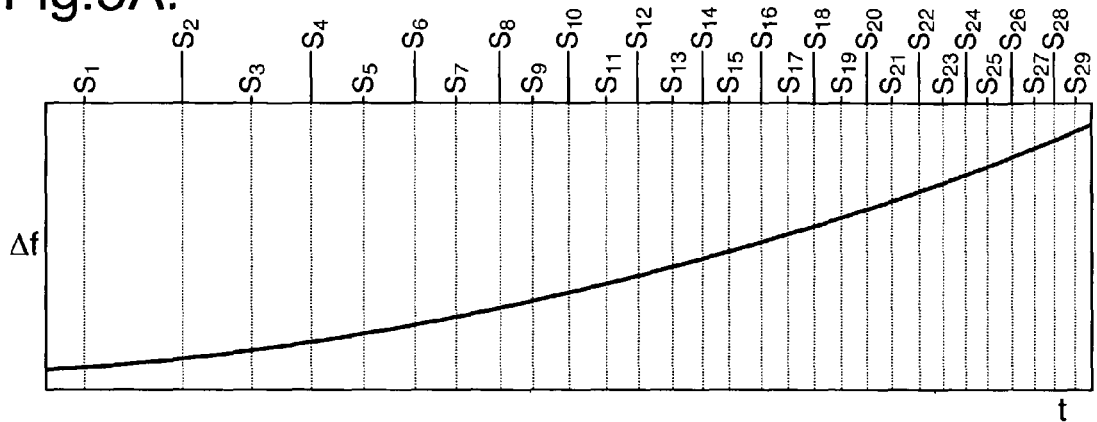
FIG. 5 illustrates the principle of operation of the radar apparatus of FIG. 4.

Referring to FIG. 5a, the frequency difference ($\Delta f$) between the frequency sweep signal and the delayed frequency sweep signal produced by the artificial target (i.e. the signal output by detector 76) is shown. It can be seen that although the delay introduced by the optical fibre delay line 74 is fixed, the non-linearity of the frequency sweep produces a variation in the frequency difference (Δf) between the frequency sweep signal and the delayed frequency sweep signal over a sweep period. This is the same effect described with reference to FIG. 3.

It is well known that mixing two signal produces a signal having a frequency equal to the frequency difference between those two signals. Mixing the frequency sweep signal and the delayed frequency sweep signal thus produces a resultant "beat" signal that has a frequency that varies with time in the manner illustrated in figure 5b. A signal of the type illustrated in FIG. 5b will thus be generated by the delay line discriminator 52 on receipt of a highly non-linear frequency sweep signal.

Figure 5B:
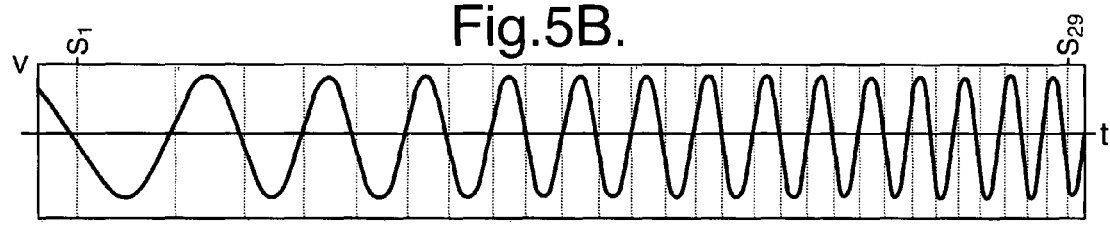
Figure 5C:
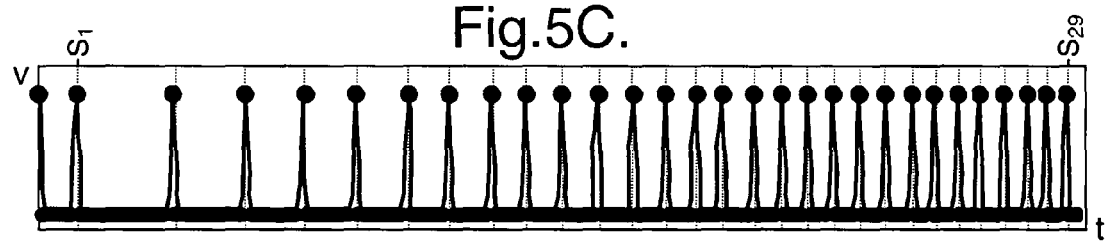

The zero-crossing detector 78 takes the signal shown in FIG. 5b and produces therefrom the clocking pulses shown in FIG. 5c. In this case, the delay line length is equivalent to the maximum instrumented range and the frequency doubler 77 is activated thereby doubling the frequency that is output by the discriminator. The zero-crossing detector is arranged to generate clock pulses on both negative and positive zero-crossings so that the sampling rate satisfies the Nyquist criteria; i.e. so that sampling occurs at a frequency that is twice the frequency of the highest frequency component of the signal being sampled. If the delay is equivalent to twice the maximum instrumented range and the frequency doubler 77 is activated, then only the positive, or negative, zero-crossings are required. However, for a delay equivalent to twice the maximum instrumented range it would be preferred to deactivate (i.e. bypass) the frequency doubler 77 and use the zero crossing detector to generate clock pulses on both negative and positive zero-crossings. These clock pulses determine the points in time at which the ADC 80 samples the baseband return signal and are illustrated by dashed lines $S_1$ to $S_{29}$ in FIG. 5.

Figure 5D:
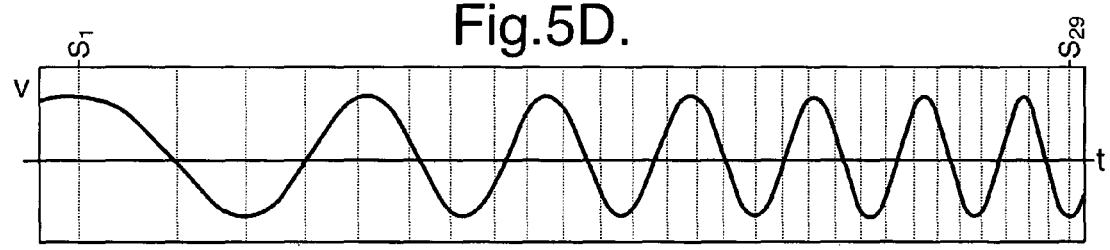

FIG. 5d illustrates a baseband return signal that could be fed to the ADC 80 from the conditioning circuit 82. As described above, the baseband return signal of FIG. 5d is generated by mixing the return radar signal with a portion of the signal being transmitted. The return signal can be seen to have a frequency that varies with time in a manner analogous with the artificial target signal of FIG. 5b; this again arises from the non-linearity of the frequency sweep causing the frequency difference between the return and transmitted signal to vary over the sweep period. The waveform of FIG. 5d is sampled by the ADC 80 at the interval times $S_1$ to $S_{29}$ that are generated by the zero crossing detector 78.

Figure 5E:
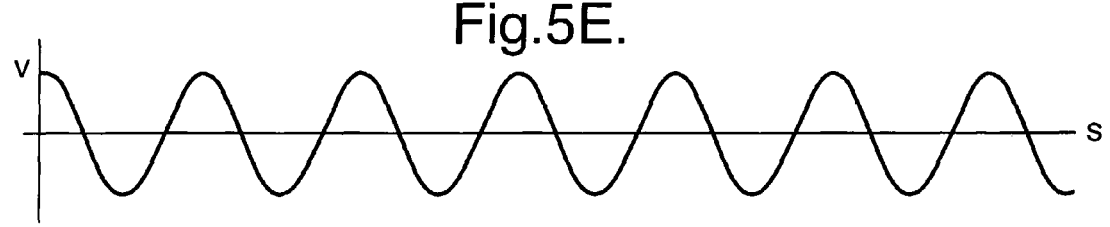

FIG. 5e shows the sampled waveform of FIG. 5d re-plotted assuming a fixed sampling interval. In other words, the signal is replotted as a function of sampling time s as determined by the zero crossing detector 78 and not as a function of real time. It can be seen that the non-linearity of the frequency response has been removed by this process and a signal is passed to the DSP 88 that has a constant frequency. This allows the range to be readily and unambiguously extracted from the signal. It should be noted that the baseband return signal of FIG. 5d has radar returns from a target at a single range; in reality many difference range components may be present each of which can be resolved by the DSP 88 from the resulting linearised signal output, by the ADC 80.

As mentioned above, an advantage of the apparatus of the present invention is that the discriminator can comprise a number of switchable optical delay lines and/or a multi-tap optical delay line. This allows a radar to be provided in which the delay imparted by the optical fibre delay line can be altered during use. However, it should be noted, that alteration of the imparted delay will also have an effect on the performance parameters and system settings of the radar. It may thus be necessary, depending on the desired use of the radar, to alter other properties of the radar when the imparted delay to the swept frequency signal is changed.

As an example, the following equations (2) to (5) can be used to define various properties of the radar where $R_{max}$ is the maximum radar instrumented range, the delay line length is $R_{max}$ or $2R_{max}$, ΔF is the sweep bandwidth and ΔT is the duration of sweep.

The range resolution (ΔR) can be described by:

$$\Delta R = \frac{c}{2\Delta F} \quad (2)$$

The number (N) of time samples, which is related to the required FFT length, will be given by;

$$N = \frac{4R_{max}\Delta F}{c} \quad (3)$$

The sample rate (S) can be expressed as:

$$F_{filter} = \frac{2R_{max}\Delta F}{c\Delta T} \quad (5)$$

The anti-alias filter cut-off frequency ($F_{filter}$) will be:

$$S = \frac{4R_{max}\Delta F}{c\Delta T} \quad (4)$$

Following from equations (2) to (5), table 1 shows the effect on the radar resolution, the required FFT length, the required sample rate, the required anti-alias filter cut-off and the maximum range when halving delay line length (i.e. from $2R_{max}$ to $R_{max}$), frequency sweep or sweep duration.

TABLE 1

| | Result of halving specified parameter | | | | |
|---|---|---|---|---|---|
| | Resolution | FFT length | Sample rate | Filter cut-off | Maximum range |
| Delay line length | No change | Halves | Halves | Halves | Halves |
| Frequency sweep | Halves | Halves | Halves | Halves | No change |
| Sweep duration | No change | No change | Doubles | Doubles | No change |

It can be seen that the various radar configuration and performance criteria are governed by a complex interrelationship and that a radar system of the present invention could be configured in numerous different ways.

Table 2 gives an example of how a multi-tap optical delay line could be used to implement a radar that is switchable between four different ranges. The sweep time of the radar is fixed at 3.2768 ms, the FFT length is fixed at 16 k points, the sampling frequency is fixed at 5 Msps and the anti-alias filter cut-off is fixed at 2.5 MHz. As noted above the delay line length can be easily altered, the frequency sweep is readily changeable by reprogramming the voltage tuning signal applied to the VCO 44 of the frequency sweep generator 42 and the clock factor (i.e. whether the zero-crossing detector 78 clocks 1 zero crossing per cycle or 2 zero crossings per cycle) can be changed by activating/deactivating the frequency doubler 77. Therefore, alteration of the frequency sweep, optical delay line length and clock factor can be seen to provide a radar that can operate with a maximum range of around 0.5 km, 1 km, 2 km or 4 km. A radar that has a range which can be easily altered during use is thus provided.

TABLE 2

Multi-tap optical fibre device configurations.

|  | 1 | 2 | 3 | 4 |
|---|---|---|---|---|
| Frequency sweep/MHz | 2400 | 1200 | 600 | 300 |
| Delay line length/m | 1024 | 1024 | 2048 | 4096 |
| Clock factor | 1 | 2 | 2 | 2 |
| Range resolution/m | 0.0625 | 0.125 | 0.25 | 0.5 |
| Maximum range/m | 512 | 1024 | 2048 | 4096 |

Although the FMCW radar described above can be used in many applications, it is particularly suited for applications where high resolution radar data is required. Examples include debris detection on airport runways, perimeter security, cloud radar, automotive collision avoidance, surveying and level measurement. A skilled person would appreciate the numerous alternative potential applications of a radar system of the present invention.

A radar system according to the present invention has been shown to be particularly suited to the detection of Foreign Object Debris (FOD) at airports. FOD includes any object found in an inappropriate location that, as a result of being in that location, can damage equipment or injure an airplane or airport personnel. The resulting damage is estimated to cost the aerospace industry $4 billion a year. Since the Air France Concorde tragedy in July 2000, a sequence of events triggered by a 16 inch metal strip on the runway, there has been considerable increased-interest in improved techniques for detecting FOD and removing it in a timely manner in all weathers with minimal disruption to airport operations. Currently, manual inspections are carried out typically once every 4 hours by driving along the length of the runway. The effectiveness is limited due to visibility and human error and the technique is ineffective in the dark.

The key to the design of a radar dedicated to FOD detection is in minimising the return from runway clutter whilst maintaining detection against FOD. This is achieved through (i) minimising the azimuthal beamwidth; (ii) using very high range resolution; (iii) siting the radar for optimal grazing angle and (iv) receiving orthogonal polarisations. An FMCW radar of the type described herein, operating at a centre frequency at 94.5 GHz, achieves the necessary range resolution and can also meet all the other criteria.

A radar according to the present invention has been demonstrated that transmits right hand circularly (RHC) polarised radiation and receives both left hand circularly (LHC) polarised radiation and RHC polarised radiation. The receive diversity was chosen to improve the detection probability against FOD and, also, to provide capability in rain. The radar is mounted on a 360° azimuthal turntable and rotates, typically, at 3°/s. The rotation rate is slow to allow sufficient "hits" per dwell but should ideally be fast enough to provide an update after every take-off or landing.

The siting of the radar is important and is very dependent upon the airport topography and the runway surface characteristics. Runway surfaces may be sloped or crowned and may be grooved dependent upon the requirement for water run-off. The ideal grazing angle with respect to the runway surface is such that the radar is at the point where it just starts to detect the runway surface.

An FMCW radar fabricated in accordance with the present invention has been shown to have the characteristics shown in table 3. The radar comprises 8192 range cells of 0.25 m resolution giving a maximum indicated range of 2048 m. A frequency sweep linearity of less than 0.01% combined with a sweep bandwidth of 600 MHz results in the large number of range cells that are attained. It should be noted that the present invention could allow even larger sweep bandwidths to be achieved; for example, a bandwidth up to 4 GHz is readily achieved.

The performance of the radar has been assessed at several airport locations. Typically the radar is located 5 m above the height of the runway surface and 200 m from the nearest part of the runway. Extensive experiments have been carried out against known reflectors and against real items of FOD placed at different orientations on the runway.

TABLE 3

FMCW performance parameters.

| Centre frequency | 94.5 GHz |
|---|---|
| Modulation | FMCW 600 MHz sawtooth |
| Transmit power | 150 mW |
| Sweep time | 2.58 ms |
| Transmit polarisation | RHC |
| Receive polarisation | RHC and LHC |
| Azimuth beamwidth | 0.2° |
| Elevation beamwidth | 2.0° |
| Scan time | 3°/s typical |
| Range resolution | 0.25 m |
| Instrumented range | 2048 m |
| Receiver noise figure | 6.5 dB |

Figure 6:
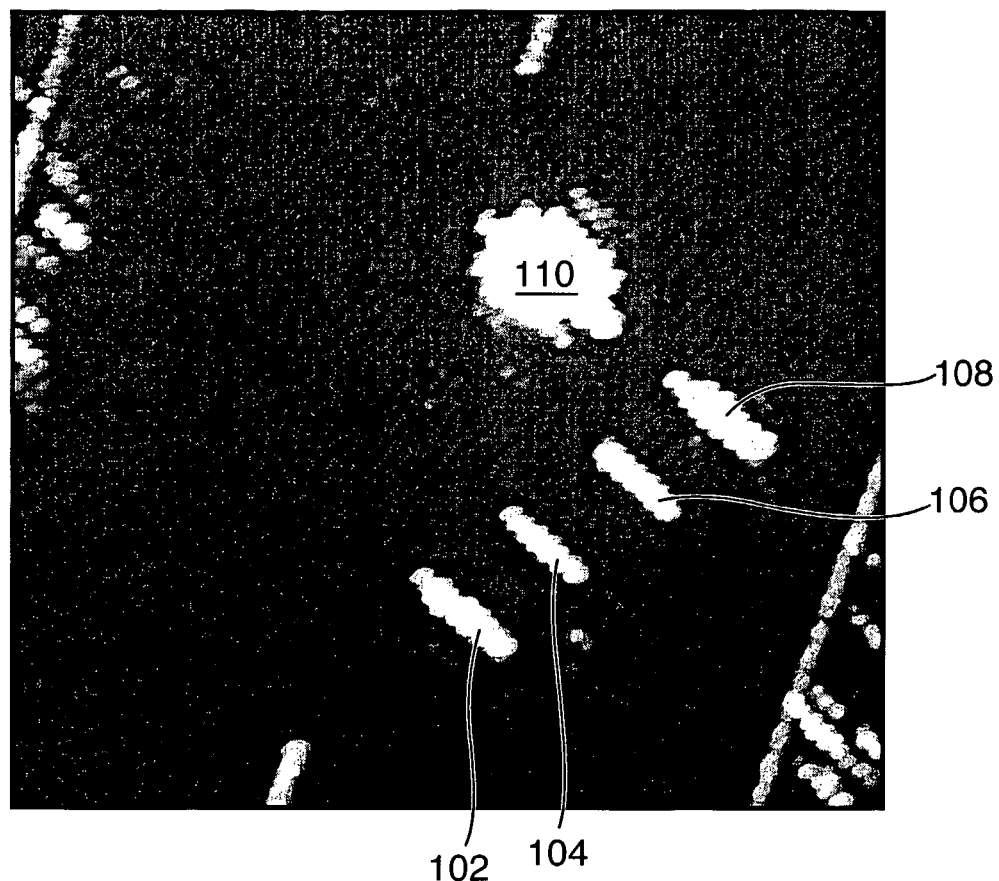
FIG. 6 is an image of the output of a radar of the present invention when used to image object on an airport runway.

Referring to FIG. 6, the detection of four objects spaced 2 m apart on a runway surface at 1000 m is illustrated. The items from left to right are (i) an M12 bolt head-on (indicated by reference numeral 102), (ii) a metal strip similar to the one leading to the Concorde crash (indicated by reference numeral 104), (iii) a glass bottle on its side (indicated by reference numeral 106) and (iv) a small plastic bottle on its side (indicated by reference numeral 108). The larger target (indicated by reference numeral 110) is a person.

Figure 7A:
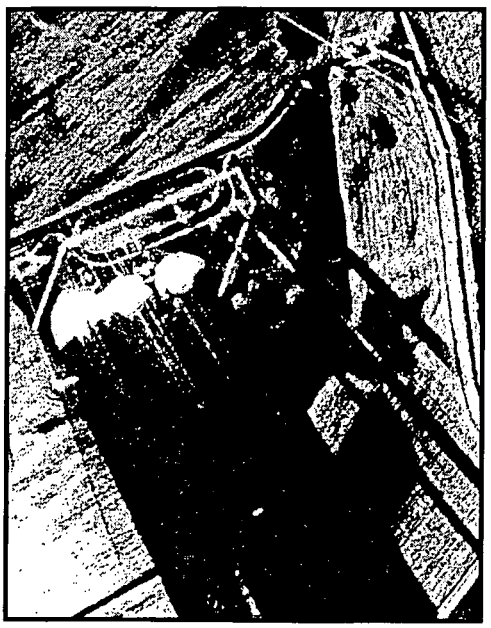
FIG. 7 shows two images of the output of a radar of the present invention when used to image the perimeter of an airport runway.
Figure 7B:

Referring to FIG. 7*a*, an area 300 m by 400 m is shown that comprises three earth mounds within a perimeter fence Road tracks are clearly visible and the contours of grassland, including the direction the grass has been cut, can be seen. Shadowing due to the earth mounds and other objects are also evident. FIG. 7*b* shows a close-up of the perimeter fence, 35 m by 55 m. The fence posts at 3 m intervals are clearly distinguishable.

It can thus be seen the FMCW radar of the present invention is particularly suited to detecting very small foreign objects and debris (FOD) on airport runways.

The invention claimed is:

1. A frequency modulated continuous wave (FMCW) radar comprising;
    a frequency sweep generator for producing a swept frequency signal;
    a discriminator for receiving a portion of the swept frequency signal and for producing a reference difference-frequency signal of frequency equal to the difference between the frequency of the swept frequency signal and the frequency of a time displaced swept frequency signal derived from the swept frequency signal, said discriminator comprising an optical delay means for producing the time displaced swept frequency signal;

a transceiver for generating the signal to be transmitted by the radar from the swept frequency signal and for receiving returned target signals, the transceiver also producing a target difference-frequency signal of frequency equal to the difference between the frequency of the signal transmitted by the radar and the frequency of the signal returned to the radar from a remote target(s); and an analogue-to-digital converter (ADC) for sampling the target difference-frequency signal at a rate derived from the frequency of the reference difference-frequency signal, and producing a linearized open loop digitized target difference-frequency signal.

2. A radar according to claim 1 wherein the optical delay means comprises at least one optical fibre delay line.

3. A radar according to claim 1 wherein the optical delay means comprises at least one laser diode.

4. A radar according to claim 1 wherein the optical delay means comprises at least one optical detector.

5. A radar according to claim 1 wherein the optical delay means is arranged to produce a time displaced frequency swept signal having any one of a plurality of different time displacements relative to the frequency swept signal.

6. A radar according to claim 5 wherein the optical delay means comprises a multi-tap optical fibre delay line.

7. A radar according to claim 5 wherein the optical delay means comprises a plurality of optical fibres of different lengths.

8. A radar according to claim 1 wherein the delay imparted by the optical delay means is selected to be equivalent to a multiple of the time-of-flight of a transmitted signal to a target at the maximum required radar range.

9. A radar according to claim 1 in which an analyser is provided to convert the reference difference-frequency signal produced by the discriminator into a series of timing pulses that are separated by intervals related to the frequency of the reference difference-frequency signal, wherein the timing pulses are used to clock the ADC.

10. A radar according to claim 9 wherein the analyser comprises a zero crossing detector.

11. A radar according to claim 1 wherein the frequency sweep generator is arranged to output any one of a saw-tooth and triangular wave swept frequency signal.

12. A radar according to claim 1 wherein the frequency sweep generator comprises a voltage controlled oscillator.

13. A radar according to claim 12 wherein the frequency sweep generator comprises a voltage signal generator for outputting a digitally pre-distorted tuning signal to the voltage controlled oscillator.

14. A radar according to claim 12 wherein the voltage controlled oscillator produces a swept frequency signal having a linearity better than 10%.

15. A radar according to claim 1 wherein the swept frequency signal produced by the frequency sweep generator has a frequency range within a first frequency band and the signal transmitted by the radar has a frequency range within a second frequency band, the frequencies contained in the first frequency band being lower than the frequencies contained in the second frequency band.

16. A radar according to claim 15 wherein the transceiver comprises a frequency up-converter for increasing the frequency of the swept frequency signal to the frequency of the signal to be transmitted by the radar.

17. A radar according to claim 16 wherein the frequency up-converter comprises a stable local oscillator (STALO).

18. A radar according to claim 1 and further comprising an antenna.

19. A radar according to claim 18 wherein the antenna comprises separate transmit and receive antenna elements.

20. A radar according to claim 1 arranged to transmit a signal within a frequency band of 9 GHz to 150 GHz.

21. A radar according to claim 20 arranged to transmit a signal having a frequency within at least one of the frequency bands of 70-80 GHz and 90-100 GHz.

22. A radar according to claim 20 arranged to transmit a signal having a frequency around at least one of 77 GHz and 94.5 GHz.

23. A radar according to claim 1 arranged to transmit a signal having a frequency greater than 40 GHz.

24. A radar according to claim 1 wherein the optical delay means comprises an optical waveguide that produces a delay equivalent to the delay imparted by a free space path length of more than 100 meters.

25. A radar according to claim 24 wherein the optical delay means comprises an optical waveguide that produces a delay equivalent to the delay imparted by a free space path length of more than 500 meters.

26. A radar according to claim 25 wherein the optical delay means comprises an optical waveguide that produces a delay equivalent to the delay imparted by a free space path length of more than 1 kilometer.

27. An apparatus for detecting a object on a surface comprising a radar according to claim 1.

28. An apparatus according to claim 27 wherein the object is foreign object debris (FOD) and the surface is an airport runway.

29. A perimeter security apparatus comprising a radar according to claim 1.

30. A frequency linearisation module for a frequency modulated continuous wave (FMCW) radar comprising:

a frequency sweep generator for producing a swept frequency signal;

a discriminator for receiving a portion of the swept frequency signal and producing a reference difference-frequency signal having a frequency equal to the difference between the frequency of the swept frequency signal and the frequency of a time displaced swept frequency signal derived from the swept frequency signal, and a sampling clock output for clocking an analogue to digital converter (ADC), said sampling clock derived from the reference difference frequency signal, wherein said ADC is used to sample an open loop target difference signal obtained from a transceiver of the FMCW radar, wherein the discriminator comprises an optical delay means for producing the time displaced frequency swept signal.

31. A method of operating a frequency modulated continuous wave (FMCW) radar comprising the steps of;

(i) generating a swept frequency signal;

(ii) producing a reference difference-frequency signal of frequency equal to the difference between the frequency of the swept frequency signal and the frequency of a time displaced swept frequency signal derived from the swept frequency signal;

(iii) generating a signal to be transmitted by the radar from the swept frequency signal, (iv) producing a target difference-frequency signal of frequency equal to the difference between the frequency of the signal transmitted by the radar and the frequency of the signal returned to the radar from a remote target(s); and (v) sampling the target difference-frequency signal using an analogue-to-digital converter (ADC) wherein the ADC sampling rate is derived from the frequency of the reference difference-frequency signal, and said sampling produces a linearized open loop digitized target difference-frequency signal, wherein the time displaced frequency swept signal used in the step (ii) of producing a reference difference-frequency signal is generated using an optical delay means; and producing a linearized open loop digitized target difference-frequency signal.

32. A method according to claim 31 and further comprising the step of using the radar to detect an object on a surface.

33. A method according to claim 32 wherein the step of using the radar to detect an object on a surface comprises using the radar to detect foreign object debris (FOD) on an airport runway.

34. A method according to claim 31 and further comprising the step of using the radar to monitor the perimeter of a defined area.

* * * * *